United States Patent
Son

(10) Patent No.: US 9,126,385 B2
(45) Date of Patent: Sep. 8, 2015

(54) DISPLAY PANEL AND ADHESIVE COATING APPARATUS AND METHOD

(71) Applicant: LG DISPLAY CO., LTD., Seoul (KR)

(72) Inventor: Hae Joon Son, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 37 days.

(21) Appl. No.: 14/044,366

(22) Filed: Oct. 2, 2013

(65) Prior Publication Data

US 2014/0134406 A1    May 15, 2014

(30) Foreign Application Priority Data

Nov. 13, 2012  (KR) .......................... 10-2012-0128392

(51) Int. Cl.
  *B32B 3/00* (2006.01)
  *B32B 7/14* (2006.01)
  *G02F 1/1335* (2006.01)

(52) U.S. Cl.
  CPC ............ *B32B 7/14* (2013.01); *G02F 1/133606* (2013.01); *Y10T 428/24777* (2015.01)

(58) Field of Classification Search
  CPC ................ Y10T 156/10; Y10T 156/17; Y10T 428/24355; G02F 1/133606
  USPC ................... 428/192, 204; 156/107, 295, 578
  See application file for complete search history.

(56) References Cited

U.S. PATENT DOCUMENTS

2005/0188920 A1    9/2005  Shimoda
2012/0320327 A1*  12/2012  Park et al. .................... 349/153

FOREIGN PATENT DOCUMENTS

| CN | 1651153 A | 8/2005 |
| CN | 101878071 A | 11/2010 |
| CN | 101927223 A | 12/2010 |
| CN | 102736299 A | 10/2012 |
| JP | H01184061 A | 7/1989 |
| JP | 2000093866 A | 4/2000 |
| JP | 2008046307 A | 2/2008 |
| KR | 20040078063 A | 9/2004 |

* cited by examiner

*Primary Examiner* — Elizabeth Mulvaney
(74) *Attorney, Agent, or Firm* — Brinks Gilson & Lione

(57) ABSTRACT

Disclosed are an adhesive coating method and apparatus and a display panel. The adhesive coating method moves a coating unit at a first speed for forming a plurality of adhesive dots, which are separated from each other by a first distance in a straight section, and the coating unit coats an adhesive for forming the adhesive dots on the first substrate. When the coating unit enters from the straight section into the corner section, the adhesive coating method accelerates the coating unit to a second speed faster than the first speed for forming a plurality of adhesive dots, which are separated from each other by a second distance greater than the first distance in a corner section.

8 Claims, 13 Drawing Sheets

DISPLAY PANEL AND ADHESIVE COATING APPARATUS AND METHOD

CROSS-REFERENCE TO RELATED APPLICATIONS

This application claims the benefit of the Korean Patent Application No. 10-2012-0128392 filed on Nov. 13, 2012, which is hereby incorporated by reference as if fully set forth herein.

BACKGROUND

1. Field of the Disclosure

The present disclosure relates to an adhesive coating apparatus and method for coupling two substrates of a display panel, and to a display panel using the same.

2. Related Art

Recently, display devices are being developed having various functions, in addition to a function of simply displaying an image, added thereto. As a type of display device, display devices with a touch screen function (enabling the direct input of information through a screen) added thereto are being actively developed. As the display devices, there are liquid crystal display (LCD) devices, plasma display panels (PDPs), field emission display (FED) devices, and light emitting display devices. Among such display devices, the LCD devices are easily manufactured, have good drivability of drivers, and realize a high-quality image, thus are popular.

The LCD devices display a moving image by using thin film transistors (TFTs) as switching elements. The LCD devices are used as display devices for notebook computers, tablet computers, navigations, and various portable information devices, in addition to televisions or monitors.

A liquid crystal display panel applied to the LCD devices includes an upper substrate and a lower substrate coupled to the upper substrate. A liquid crystal layer is formed between the upper substrate and the lower substrate. Also, a touch substrate may be adhered to a top of the upper substrate or a bottom of the lower substrate in order for the liquid crystal display panel to have the touch screen function.

FIG. 1 is a view for describing problems of a related art display panel, and FIG. 2 is a view showing an adhesive layer having lumps in the related art display panel.

Referring to FIG. 1, a related art display panel 100 includes a first substrate 110 and an adhesive layer 140 formed on the first substrate 110.

The adhesive layer 140 adheres the first substrate 110 to a second substrate (not shown) facing-coupled to the first substrate 110.

The adhesive layer 140 is formed by coating an adhesive along a coating line 130. The coating line 130 has a first straight section 131, a second straight section 132 vertical to the first straight section 131, and a corner section 133 connecting the first straight section 131 and the second straight section 132.

In a process that forms the adhesive layer 140 in the related art display panel 100, the adhesive layer 140 is formed by coating an adhesive in the order of the first straight section 131, corner section 133, and second straight section 132.

That is, as illustrated in the drawing, the adhesive is first coated on the first straight section 131, coated on the corner section 133 subsequently thereto, and then coated on the second straight section 132 in a changed direction.

In a process of coating the adhesive along the coating line 130, due to a shape of the coating line 130, the adhesive is inevitably coated on the corner section 133 two times.

Specifically, the adhesive is coated such that the adhesive layer 140 has the same thickness in the first straight section 131, second straight section 132, and corner section 133. Therefore, the same amount of adhesive as the first and second straight sections 131 and 132 is coated on the corner section 133 two times. As a result, a thickness of the adhesive layer 140 in the corner section 133 is inevitably thicker than the first and second straight sections 131 and 132. Alternatively, a height of the adhesive layer 140 in the corner section 133 is inevitably higher than the first and second straight sections 131 and 132.

For these reasons, the related art display panel has the following disadvantages. When the first substrate 110 is being coupled to the second substrate (not shown), the adhesive layer 140 in the corner section 133 is spread by being pressed by the first substrate 110 and the second substrate (not shown). An active area displaying an image is formed in a central portion of the display panel 100, but the adhesive layer 140 in the corner section 133 is spread to cover the active area. This is because the adhesive is coated two times, and thus, the adhesive layer 140 becomes thicker or higher, unlike the first straight section 131 and the second straight section 132. As a result, the adhesive layer 140 covers a portion of an image displayed by the display panel, causing a reduction in quality of an image displayed by the display panel 100.

Moreover, if the adhesive layer 140 in the corner section 133 is spread to outside the first substrate 110 and hardened, it is required to separately perform a process that, after the first substrate 110 is coupled to the second substrate (not shown), removes the adhesive layer 140 hardened at an outer side of the first substrate 110. In this case, a process of manufacturing the display panel 100 becomes complicated, and a productivity of the display panel 100 decreases.

SUMMARY

An adhesive coating method for forming an adhesive layer, which adheres a first substrate to a second substrate and includes a straight section and a corner section, includes: moving a coating unit at a first speed for forming a plurality of adhesive dots which are separated from each other by a first distance in the straight section, the coating unit coating an adhesive for forming the adhesive dots on the first substrate; and accelerating, when the coating unit enters from the straight section into the corner section, the coating unit to a second speed faster than the first speed for forming a plurality of adhesive dots which are separated from each other by a second distance greater than the first distance in the corner section.

In another aspect of the present invention, there is provided a display panel including: first substrate and second substrate coupled to each other in a direction facing each other; and an adhesive layer formed between the first substrate and second substrate, and configured to adhere the first substrate to the second substrate, wherein, the first substrate has a plurality of sides, the adhesive layer is formed to a first thickness in a first straight section parallel to a first side of the first substrate and a second straight section parallel to a second side of the first substrate vertically connected to the first side, and the adhesive layer is formed to a second thickness thinner than the first thickness in a corner section that connects the first straight section to the second straight section.

In another aspect of the present invention, there is provided an adhesive coating apparatus including: a coating unit configured to coat an adhesive on a first substrate to form a plurality of adhesive dots on the first substrate, the adhesive dots adhering the first substrate to a second substrate; a moving unit configured to move the coating unit such that the adhesive dots are formed apart from each other in the first substrate; and a control unit configured to control the moving unit to cause the coating unit to move at a first speed in a first straight section, for forming a plurality of adhesive dots which are separated from each other by a first distance in the first straight section, wherein when the coating unit enters from the first straight section into a corner section, the control unit controls the moving unit such that the coating unit entering the corner section is accelerated to a second speed faster than the first speed, for forming a plurality of adhesive dots which are separated from each other by a second distance greater than the first distance in the corner section.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of a display panel according to the present invention will be described in detail with reference to the accompanying drawings.

Figure 3:
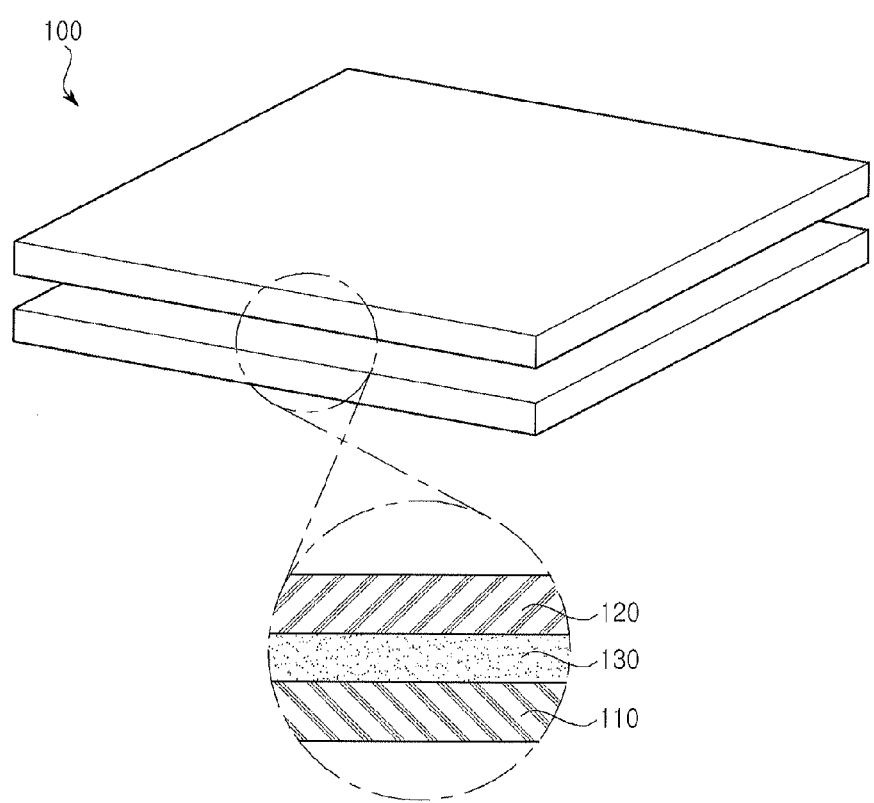
FIG. 3 is a perspective view schematically illustrating a display panel according to an embodiment of the present invention.

Referring to FIG. 3, a display panel 100 according to the present invention includes a first substrate 110 and a second substrate 120 which are coupled to each other in a direction facing each other, and an adhesive layer 140 for adhering the first substrate 110 to the second substrate 120.

The first substrate 110 and the second substrate 120 are coupled to each other in a direction facing each other, and the adhesive layer 140 for adhering the first substrate 110 to the second substrate 120 is formed between the first substrate 110 and the second substrate 120.

The first substrate 110 is overall formed in a tetragonal shape, and has four sides. In the adhesive layer 140, a portion that is formed by coating an adhesive in parallel to a first side of the four sides of the first substrate 110 is referred to as a first straight section 131. In the adhesive layer 140, a portion that is formed by coating an adhesive in parallel to a second side vertical to the first side of the first substrate 110 is referred to as a second straight section 132. In the adhesive layer 140, the first straight section 131 is perpendicular to the second straight section 132.

In the adhesive layer 140, a portion connecting the first straight section 131 to the second straight section 132 is referred to as a corner section 133. A thickness of the adhesive layer 140 in the corner section 133 is thinner than that of the adhesive layer 140 in the first and second straight sections 131 and 132. That is, when a thickness of the adhesive layer 140 in the first and second straight sections 131 and 132 is defined as a first thickness and the thickness of the adhesive layer 140 in the corner section 133 is defined as a second thickness, the second thickness is thinner than the first thickness.

In the background art, an adhesive is coated on the corner section 133 two times. However, in the display panel 100 according to the present invention, even though the adhesive is coated on the corner section 133 two times, the thickness of the adhesive layer 140 in the corner section 133 may be similar to or thinner than that of the adhesive layer 140 in the first and second straight sections 131 and 132. Also, a height of the adhesive layer 140 in the corner section 133 may be similar to or lower than that of the adhesive layer 140 in the first and second straight sections 131 and 132.

Accordingly, the display panel 100 according to the present invention has the following effects.

First, in the display panel 100 according to the present invention, even though the adhesive is coated on the corner section 133 two times, the thickness of the adhesive layer 140 in the corner section 133 is thinner than that of the adhesive layer 140 in the first and second straight sections 131 and 132. Therefore, even when the first substrate 110 and the second substrate 120 are coupled to each other to pressurize the adhesive layer 140, the present invention can prevent the adhesive layer 140 of the corner section 133 from being spread to a central portion of the first substrate 110 or minimize the spread of the adhesive layer 140. Accordingly, the present invention can prevent the adhesive layer 140 from covering an active area of the display panel 100 or minimize the covering of the active area, thus enhancing a quality of an image displayed by the display panel 100.

Moreover, even when the first substrate 110 and the second substrate 120 are coupled to each other to pressurize the adhesive layer 140, the present invention can prevent the adhesive layer 140 of the corner section 133 from being spread to outside the display panel 100 and hardened. Therefore, it is not required to separately perform a process that removes the adhesive layer 140, which is spread to outside the display panel 100 and hardened therein, from the display panel 100. Accordingly, a process of manufacturing the display panel 100 can be simplified, thus enhancing a productivity of the display panel 100.

Hereinafter, the first substrate 110, the second substrate 120, and the adhesive layer 140 will be described in detail with reference to the accompanying drawings.

Referring to FIG. 3, the first substrate 110 and the second substrate 120 are a pair of substrates which are coupled to each other in a direction facing each other. The first substrate 110 is a substrate applied to the display panel 100 according to the present invention. The first substrate 110 may be a substrate in which a thin film transistor (TFT) array is formed. Alternatively, the first substrate 110 may be a touch substrate for enabling the display panel 100 to functions as a touch screen. The first substrate 110 is generally formed in a tetragonal shape in correspondence with a shape of the display panel 100 according to the present invention.

Referring to FIG. 3, the second substrate 120 is a substrate coupled to the first substrate 110. The second substrate 120 is a substrate applied to the display panel 100 according to the present invention. The second substrate 120 may be a substrate in which a color filter layer is formed. Alternatively, the second substrate 120 may be a touch substrate for enabling the display panel 100 to functions as the touch screen. The second substrate 120 is generally formed in a tetragonal shape in correspondence with the shape of the display panel 100 according to the present invention.

The first substrate 110 and the second substrate 120 are substrates coupled to each other, and may be formed to have an approximately equal size.

Figure 4:
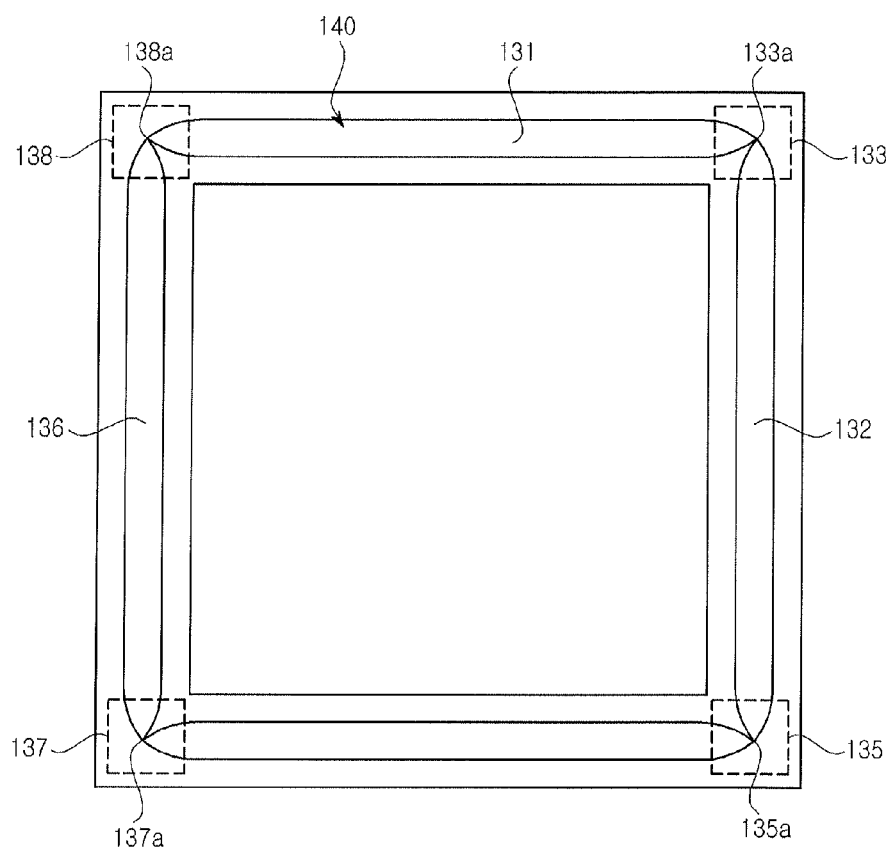
FIG. 4 is a plan view schematically illustrating a first substrate and adhesive layer of the display panel according to an embodiment of the present invention.

Referring to FIGS. 3 and 4, the adhesive layer 140 adheres the first substrate 110 to the second substrate 120. The adhesive layer 140 is formed between the first substrate 110 and the second substrate 120, and adheres the first substrate 110 to the second substrate 120.

The adhesive layer 140 is formed along a border portion of the first substrate 110 formed in a tetragonal shape. That is, an adhesive is coated along the border portion of the first substrate 110, thereby forming the adhesive layer 140. The adhesive layer 140 is formed by coating the adhesive in the order of the first straight section 131, corner section 133, and second straight section 132.

A width of the adhesive layer 140 in the corner section 133, as described above, is narrower than that of the adhesive layer 140 in the first and second straight sections 131 and 132.

Since the first substrate 110 has a tetragonal shape, the adhesive layer 140 formed along a border portion of the first substrate 110 is also formed to have an approximately tetragonal shape. As a result, the first substrate 110 includes a total of four straight sections, which are respectively defined as a first straight section 131, a second straight section 132, a third straight section 133, and a fourth straight section 136. Also, a section connecting the first straight section 131 to the second straight section 132 is defined as a first corner section 133, a section connecting the second straight section 132 to the third straight section 133 is defined as a second corner section 135, a section connecting the third straight section 133 to the fourth straight section 136 is defined as a third corner section 137, and a section connecting the fourth straight section 136 to the first straight section 131 is defined as a fourth corner section 138.

Similarly to the first corner section 133, the second to fourth corner sections 135, 137 and 138 are also formed to have a thickness thinner than the first straight section 131, the second straight section 132, and the fourth straight section 136. Accordingly, the present invention can prevent the adhesive layer 140 of each corner of the display panel 100 from being spread or minimize the spread of the adhesive layer 140, and enhance a quality of an image displayed by the display panel 100.

Figure 1:
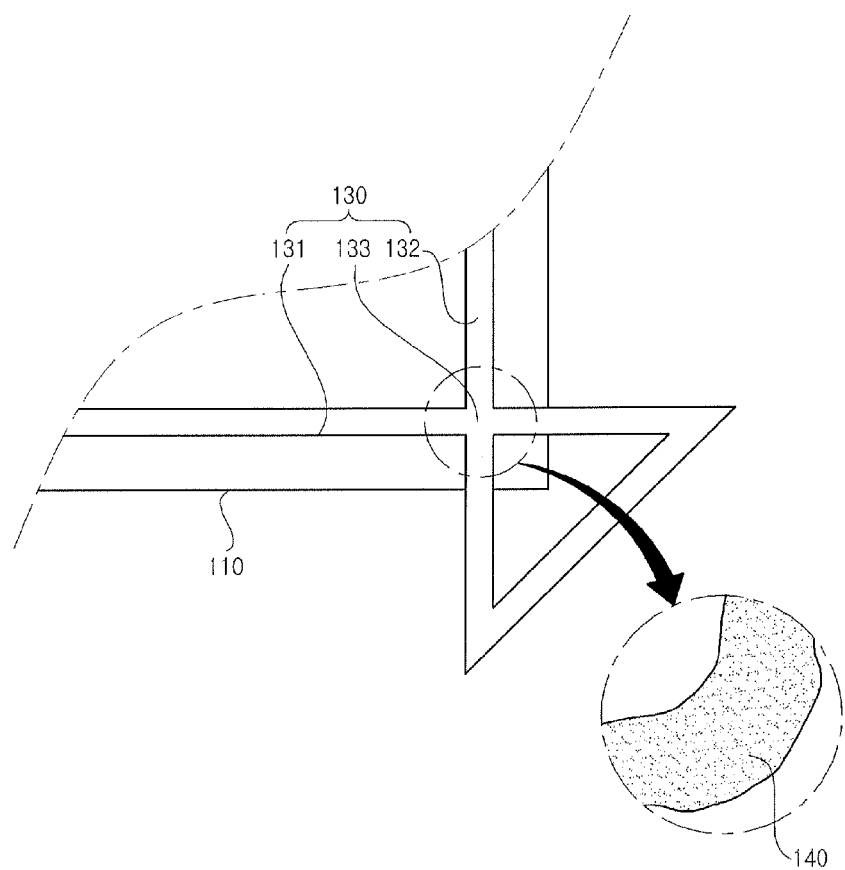
FIG. 1 is a view for describing problems of a related art display panel.
Figure 2:
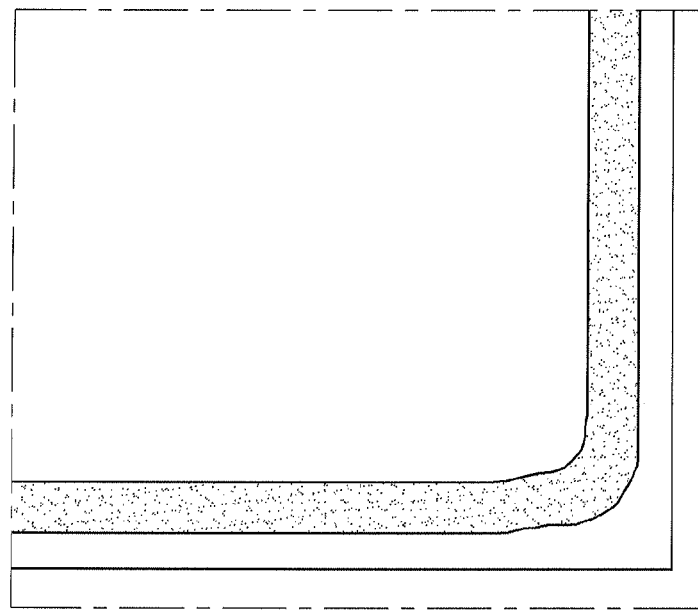
FIG. 2 is a view showing an adhesive layer having lumps in the related art display panel.
Figure 13:
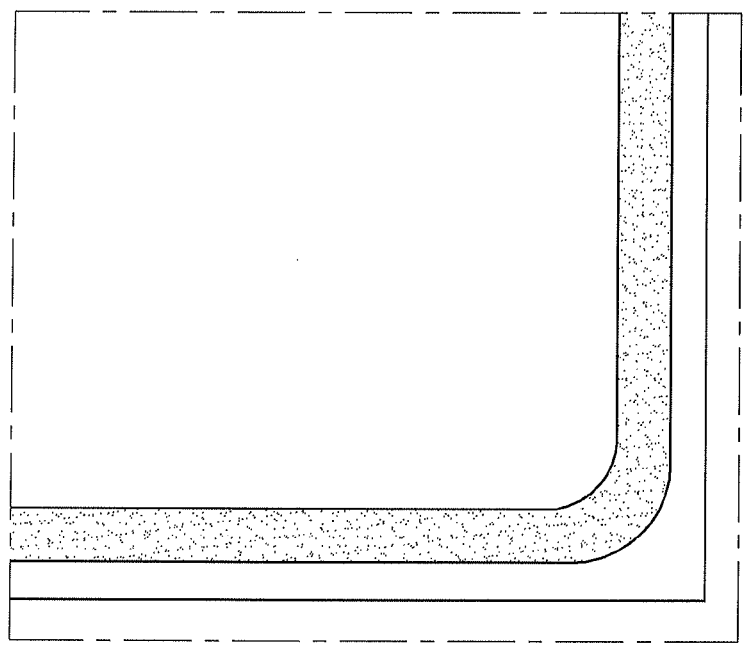
FIG. 13 is a view illustrating the adhesive layer in the display panel according to an embodiment of the present invention.

The adhesive layer 140 of the display panel 100 according to the present invention is illustrated in FIG. 13. Compared to the adhesive layer 140 of the related art display panel 100 of FIG. 2, it can be seen that a thickness and height of the adhesive layer 140 in the corner section 133 are formed equally to those of the adhesive layer 140 in the first and second straight sections 131 and 132.

Hereinafter, embodiments of the adhesive coating apparatus according to the present invention will be described in detail with reference to the accompanying drawings.

Referring to FIGS. 5 to 8, the adhesive coating apparatus according to the present invention includes a coating unit 2 that coats an adhesive for adhering the first substrate 110 to the second substrate 120 on the first substrate 110, a moving unit 3 that moves the coat unit 2, and a control unit 4 that controls the moving unit 3.

Figure 5:
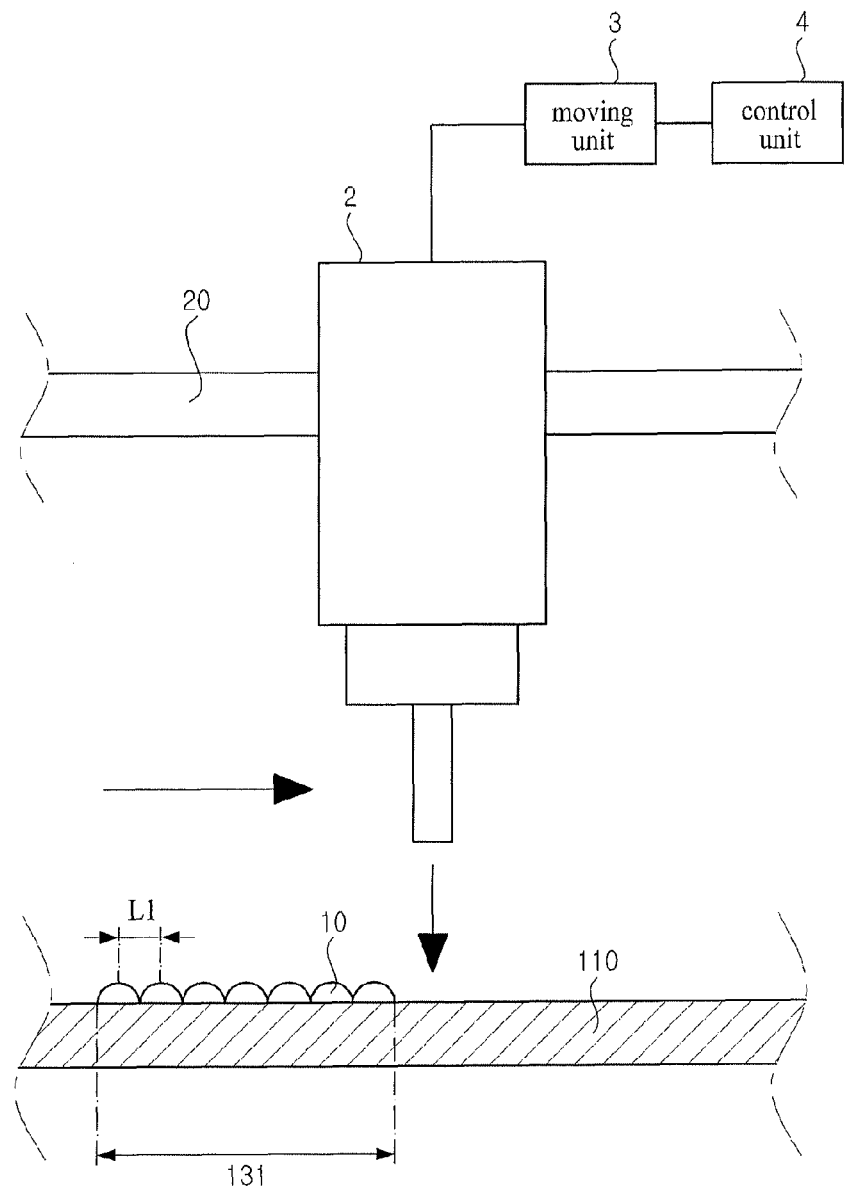
FIGS. 5 and 6 are views for describing an operation of an adhesive coating apparatus according to an embodiment of the present invention in a first straight section.
Figure 7:
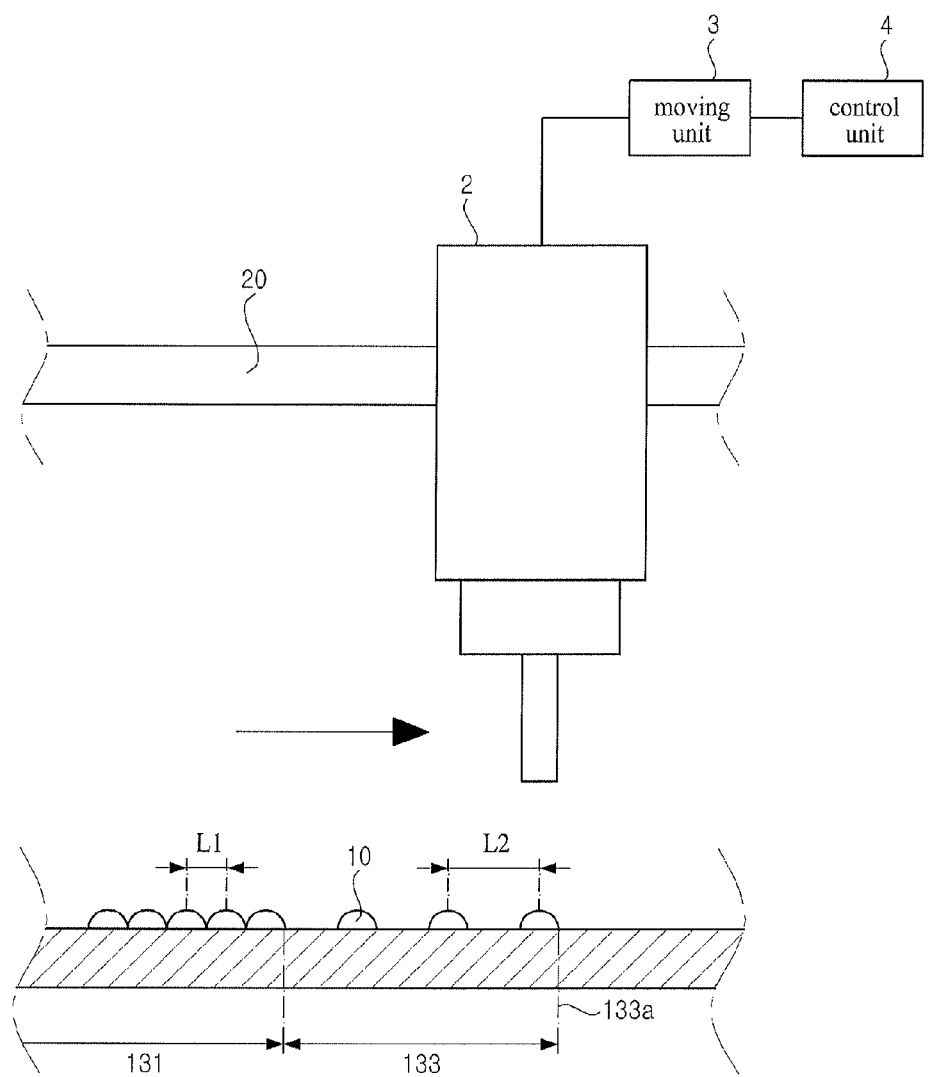
FIGS. 7 and 8 are views for describing an operation of the adhesive coating apparatus according to an embodiment of the present invention in a corner section.

Referring to FIGS. 5 and 7, the coating unit 2 coats the adhesive on the first substrate 110. The coating unit 2 coats the adhesive on the first substrate 110 to form the adhesive layer 140 on the first substrate 110. The coating unit 2 discontinuously sprays the adhesive in order for a plurality of adhesive dots 10 to be formed on the first substrate 110. As a result, the coating unit 2 coats the adhesive on the first substrate 110 in the form of adhesive dots 10.

The coating unit 2 may be a jetting value for coating the adhesive in the form of adhesive dots 10. When power is applied to the coating unit 2, the coating unit 2 operates and sprays the adhesive. On the other hand, when power is disconnected from the coating unit 2, the coating unit 2 immediately stops the operation and stops the spray of the adhesive.

The coating unit 2 having a jetting valve type sprays the adhesive in the form of adhesive dots 10 while moving. As a result, the adhesive dots 10 coated on the first substrate 110 by the coating unit 2 are arranged at certain intervals apart from each other.

The coating unit 2 is supported by a gantry 20 so as to enable the adhesive to be coated toward the first substrate 110. That is, the gantry 20 supports the coating unit 2. The coating unit 2 is movably coupled to the gantry 20. The coating unit 2 is guided and moved by the gantry 20.

Figure 11:
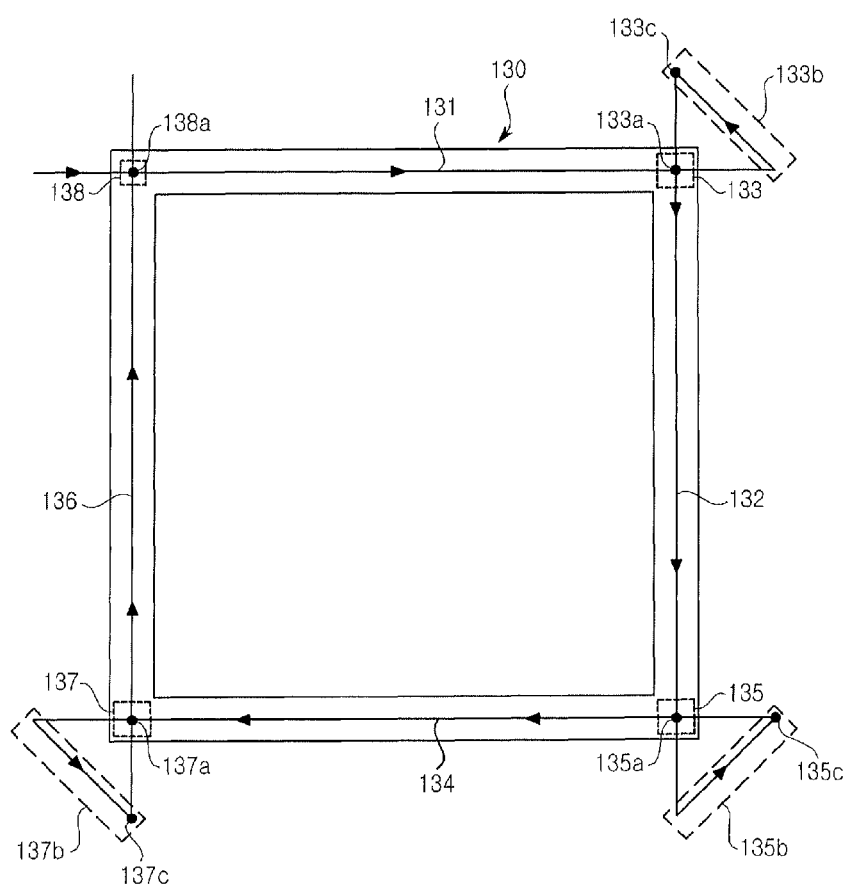
FIG. 11 is a view illustrating a coating line of the coating unit of the adhesive coating apparatus according to an embodiment of the present invention.

Referring to FIGS. 5, 7 and 11, the moving unit 3 moves the coat unit 2. The coating unit 2 coats the adhesive along the border portion of the first substrate 110 while being moved by the moving unit 3, and thus, the adhesive layer 140 is formed in a shape which is as illustrated in the drawing.

The moving unit 3 may move the coating unit 2 in a cylinder type using a hydraulic cylinder, a pneumatic cylinder, or the like, in a gear type using a rack gear, a pinion gear, etc., in a ball screw type using a ball screw or the like, in a belt type using a pulley, a belt, etc., and in a linear motor type using a coil, a permanent magnetic, etc. The moving unit 3 may raise and lower the coating unit 2. The coating unit 2 may be coupled to the moving unit 3.

The moving unit 3 moves the coating unit 2 along a coating line 130 of FIG. 11, and simultaneously the coating unit 2 sprays the adhesive on the first substrate 110, thereby forming the adhesive layer 140. The coating line 130 includes a first straight section 131, the second straight section 132 vertical to the first straight section 131, and a corner section 133 connecting the first straight section 131 to the second straight section 132, for forming the adhesive layer 140.

Referring to FIGS. 5 and 7, the control unit 4 may control the moving unit 3 in order for the coating unit 2 to move at different speeds for each section.

Figure 6:
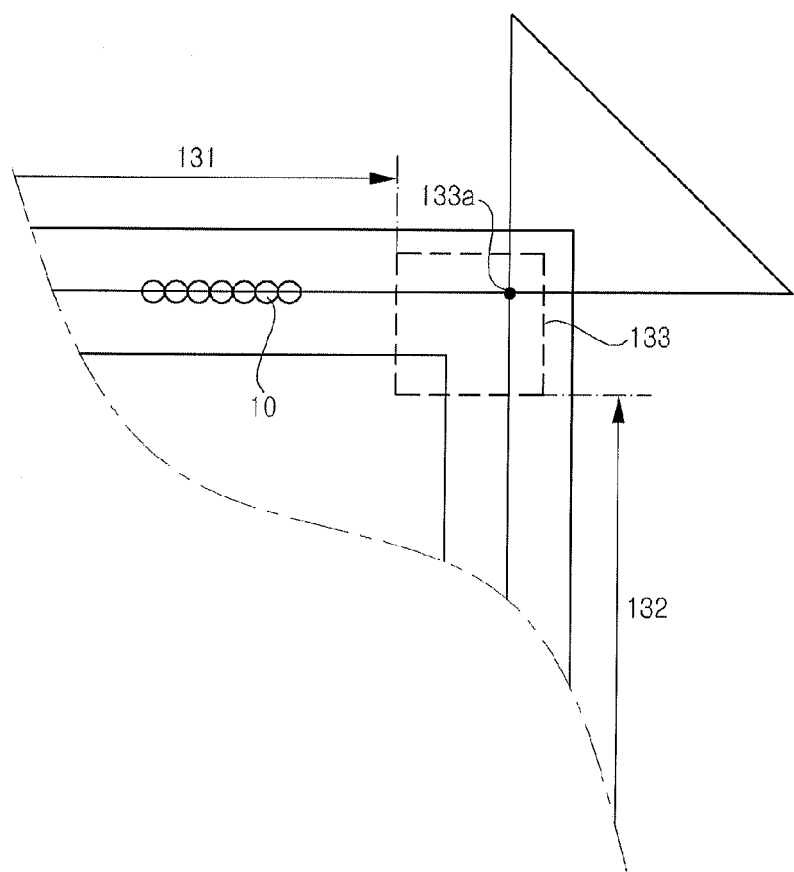

Referring to FIGS. 5 and 6, the control unit 4 controls the moving unit 3 in order for the coating unit 2 to move at a first speed in the first straight section 131. Therefore, the coating unit 2 coats the adhesive dots 10 on the first substrate 110 in order for the adhesive dots 10 to be separated from each other by a first distance L1. The adhesive dots 10 coated apart from each other has a first thickness when the first substrate 110 is coupled to the second substrate 120, in the first straight section 131. That is, the adhesive layer 140 formed by the adhesive dots 10 has the first thickness.

Figure 8:
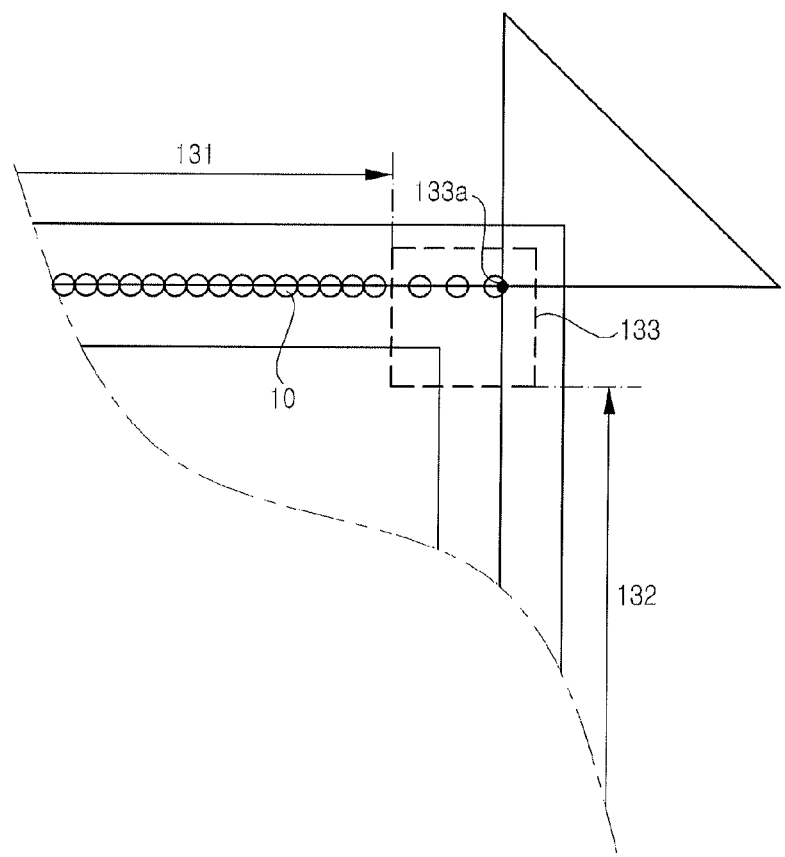

Referring to FIGS. 7 and 8, the when the coating unit 2 enters from the first straight section 131 into the corner section 133, the control unit 4 controls the moving unit 3 in order for the coating unit 2 to move at a second speed. The second speed is a speed faster than the first speed. Therefore, the coating unit 2 coats the adhesive dots 10 on the first substrate 110 in order for the adhesive dots 10 to be separated from each other by a second distance L2. Since the coating unit 2 coats the adhesive dots 10 at the second speed faster than the first speed in the corner section 133, a separation distance between the adhesive dots 10 in the corner section 133 is greater than a separation distance between the adhesive dots 10 in the first straight section 131. Therefore, the second distance L2 is greater than the first distance L1. The adhesive dots 10 coated to be separated from each other by the second distance L2 has a second thickness when the first substrate 110 is coupled to the second substrate 120, in the corner section 133. That is, the adhesive layer 140 formed by the adhesive dots 10 has the second thickness. Since the second distance L2, which is a separation distance between the adhesive dots 10 in the corner section 133, is greater than the first distance L1 that is a separation distance between the adhesive dots 10 in the first straight section 131, A density of the adhesive dots 10 in the corner section 133 is less than a density of the adhesive dots 10 in the first straight section 131. As a result, a thickness of each of the adhesive dots 10 in the corner section 133 is thinner than that in the first straight section 131. Accordingly, a thickness of the adhesive layer 140 formed by the adhesive dots 10 in the corner section 133 is also thinner than that in the first straight section 131.

Referring to FIGS. 7 and 8, a point at which the first and second straight sections 131 and 132 join is defined as a first vertex 133a. Since the adhesive layer 140 is formed along the border portion of the first substrate 110, the adhesive layer 140 is formed up to the vertex point 133a. Therefore, the coating unit 2 coats the adhesive dots 10 only up to the first vertex 133a. That is, even when the coating unit 2 has passed by the first vertex 133a, the coating unit 2 is continuously moved by the moving unit 3, but the coating unit 2 does not coat the adhesive dots 10 on a portion next to the first vertex 133a. However, if the coating unit 2 sprays the adhesive dots 10 despite the coating unit 2 having passed by the first vertex 133a, this is because there is a possibility that the adhesive dots 10 are spread to outside the first substrate 110.

Figure 9:
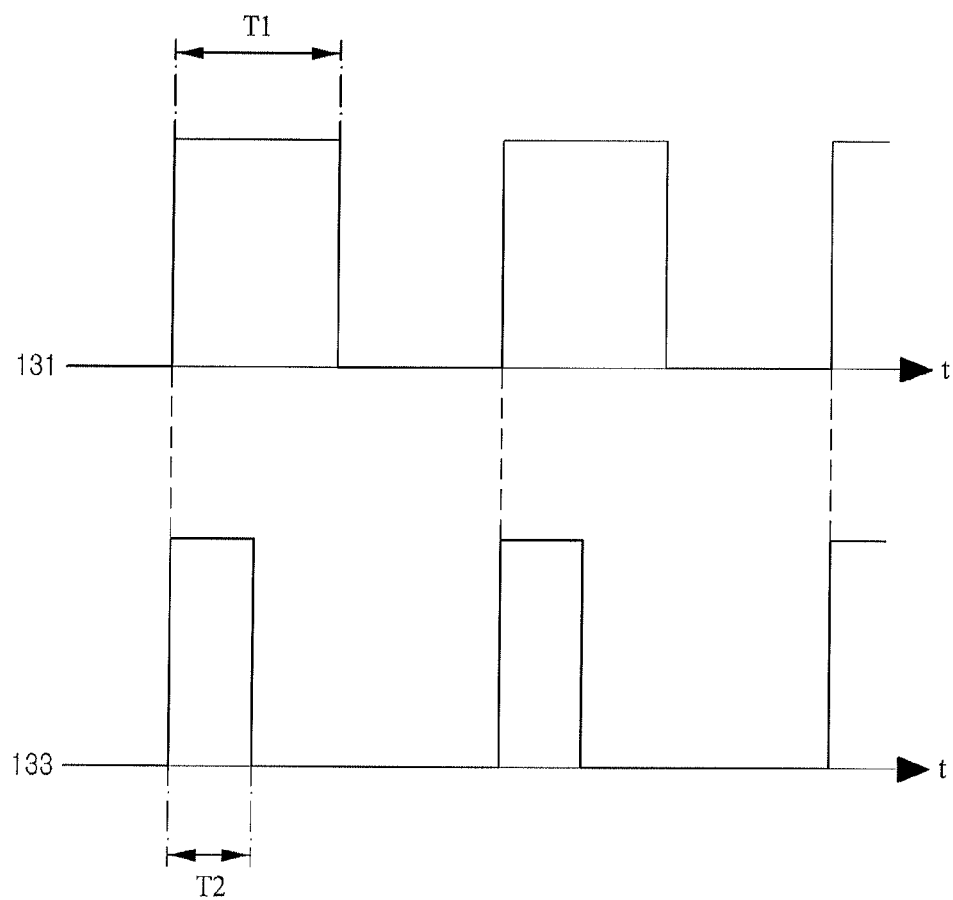
FIG. 9 is a graph showing waveforms of power supplied to a coating unit of the adhesive coating apparatus according to an embodiment of the present invention.
Figure 10:
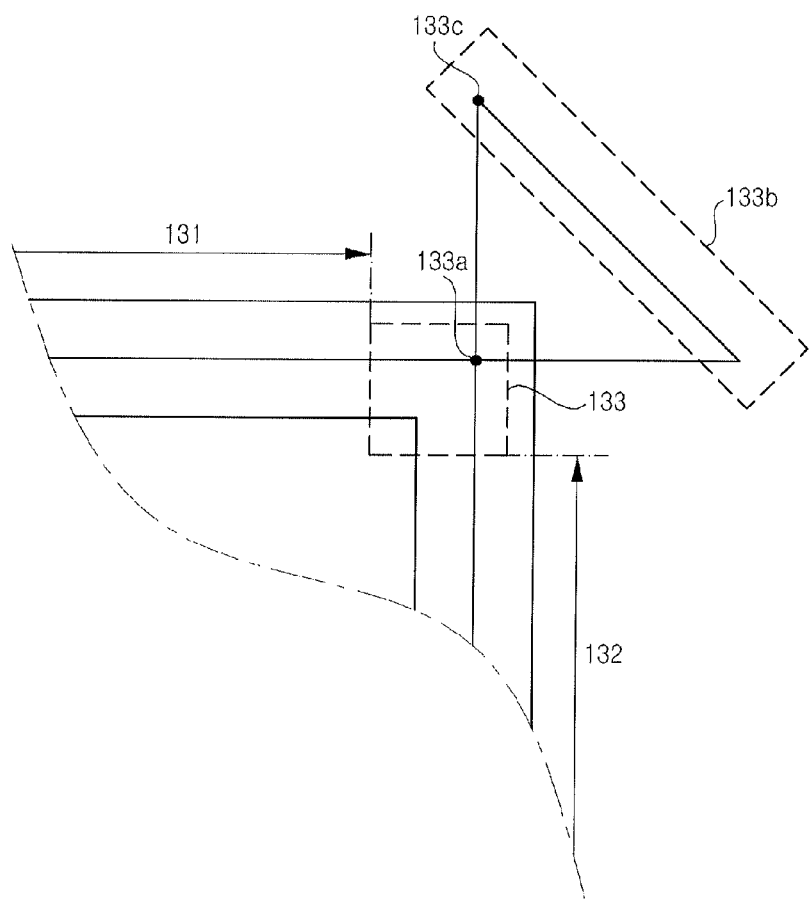
FIG. 10 is a view for describing an operation of the adhesive coating apparatus according to an embodiment of the present invention in a direction change section.

Referring to FIG. 9, a period at which a power source (not shown) for driving the coating unit 2 supplies power is shown. The power source supplies power to the coating unit 2 in a pulse type. Therefore, when the power source supplies power to the coating unit 2, the coating unit 2 coats the adhesive, and, when the power source disconnects power from the coating unit 2, the coating unit 2 stops the coating of the adhesive.

In a graph of FIG. 9, an x axis denotes a time, and a y axis denotes power that is supplied in a pulse type by the power source. In FIG. 9, an upper graph shows power which is supplied to the coating unit 2 by the power source in the first straight section 131. On the other hand, in FIG. 9, a lower graph shows power which is supplied to the coating unit 2 by the power source in the corner section 133.

Comparing the upper graph with the lower graph, a period is the same, but a period at which the power source supplies power to the coating unit 2 becomes shorter in the corner section 133. Therefore, a time for which the coating unit 2 sprays the adhesive becomes shorter, and a time for which the coating unit 2 does not spray the adhesive becomes longer. Thus, a separation distance between the adhesive dots 10 formed on the first substrate 110 in the corner section 133 becomes greater than that in the first straight section 131. Accordingly, an effect such as moving the coating unit 2 at a faster speed can be obtained A moving speed of the coating unit 2 is not adjusted, and as shown in FIG. 9, by the power source adjusting a spray time of the coating unit 2, a separation distance between the adhesive dots 10 may be changed from the first distance L1 to the second distance L2.

Alternatively, by adjusting the a moving speed of the coating unit 2 and a spray time of the coating unit 2, a separation distance between the adhesive dots 10 may be changed from the second distance L2 to the first distance L1.

Although not shown, even when a time for which the power source supplies power to the coating unit 2 is maintained and a period is extended, as described above, the separation distance between the adhesive dots 10 may be changed from the first distance L1 to the second distance L2. This is because a time, for which the coating unit 2 does not coat the adhesive, is extended by extending a period.

Referring to FIG. 11, when entering a direction change section 133b, the control unit 4 controls the moving unit 3 in order for the coating unit 2 to move at a third speed. The third speed is slower than the second speed. Since the coating unit 2 passes by the first vertex 133a and then does not coat the adhesive dots 10 on the first substrate 110, adjusting the moving speed of the coating unit 2 in the direction change section 133b is irrelevant to the separation distance between the adhesive dots 10.

If the speed of the coating unit 2 is decelerated from the second speed to the third speed in the direction change section 133b, the coating unit 2 cannot immediately change a direction at a change point 133c due to inertia, and passes by the change point 133c. Therefore, the coating unit 2 reenters the corner section 133, and, even when the coating unit passes by the reentered corner section 133 and then enters the second straight section 132, the coating unit may coat the adhesive more inward than the coating line 130. Like this, the adhesive is coated more inward than the coating line 130, and thus, when the first substrate 110 and the second substrate 120 are coupled to each other to pressurize the adhesive layer 140 formed by the adhesive, the adhesive layer 140 may be spread and cover the active area. For this reason, a quality of an image displayed by the display panel 100 can be degraded. Accordingly, the coating unit 2 needs to accurately change a direction at the change point 133c and coat the adhesive along the coating line 130.

To solve such problems, the control unit 4 controls the moving unit 3 in order for the coating unit 2 to be decelerated to the third speed slower than the second speed in the direction change section 133b, for reducing inertia caused by movement of the coating unit 2.

If the coating unit 2 moves at a slow speed (third speed) in the direction change section 133b, the coating unit 2 may accurately change a direction at the change point 133c and move along the coating line 130.

Referring to FIGS. 5 to 11, the coating unit 2 passes by the direction change section 133b and the change point 133c, and then reenters the corner section 133. At this time, the control unit 4 controls the moving unit 3 such that the coating unit 2 reentering the corner section 133 moves at the second speed again.

Even when the coating unit 2 again passes by the first vertex 133a in the corner section 133, the coating unit 2 passes by the first vertex 133a and immediately coats the adhesive dots 10 on the first substrate 110. At this time, the coating unit 2 moves at the second speed, and thus, the adhesive dots 10 formed on the first substrate 110 are separated from each other by the second distance. Also, the adhesive layer 140 formed by the adhesive dots 10 has the second thickness.

Here, the adhesive dots 10 have been already formed to be separated from each other by the coating unit 2 in the corner section 133. The coating unit 2 again coats the adhesive dots 10 to overlap the adhesive dots 10 already coated on the first substrate 110. Thus, the again coated adhesive dots 10 are separated from each other by the second distance L2, but, since the coating is performed two times, the adhesive dots 10 are separated from each other by a separation distance shorter than the second distance L2. As a result, the thickness of the adhesive layer 140 formed by the adhesive dots 10 becomes thicker than the second thickness. However, the second distance L2 is greater than the first distance L1, and the thickness of the adhesive layer 140 formed by the adhesive dots 10 is the second thickness and is thinner than the first thickness. Accordingly, even if the first substrate 110 and the second substrate 120 are coupled to each other to pressurize the adhesive layer 140 and thus the adhesive layer 140 is spread, the adhesive layer 140 is spread not to cover the active area.

Referring to FIGS. 5 to 11, when the coating unit 2 passes by the corner section 133 and enters the second straight section 132, the control unit 4 controls the moving unit 3 in order for the coating unit 2 to move at the first speed. The first speed, as described above, is a speed slower than the second speed. Therefore, the coating unit 2 coats the adhesive dots 10 on the first substrate 110 such that the adhesive dots 10 are separated from each other by the first distance L1. Also, the adhesive layer 140 formed by the adhesive dots 10 in the second straight section 132 has the first thickness.

Referring to FIG. 11, a process is illustrated in which the coating unit 2 coats the adhesive all over the first substrate 110. Again, the above-described corner section is again defined as a first corner section, and the direction change section is defined as a first direction change section.

The coating unit 2 departs from the fourth corner section 138, enters the first straight section 131, passes by the first corner section 133, and then passes by the first direction change section 133b. Subsequently, the coating unit 2 passes by the first corner section 133, and then enters the second straight section 132.

Moreover, the coating unit 2 passes by the second corner section 135 from the second straight section 132, passes by a second direction change section 135b, again passes by the second corner section 135, and enters the third straight section 133.

Subsequently, the coating unit 2 passes by the third corner section 137 from the third straight section 133, passes by a third direction change section 137b, again passes by the third corner section 137, and enters the fourth straight section 136.

Finally, as the coating unit 2 passes by the fourth corner section 138 from the fourth straight section 136, the coating unit 2 ends the coating of the adhesive.

In the straight sections 131, 132, 134 and 136, the coating unit 2 moves at the first speed, and the adhesive dots 10 coated on the first substrate 110 by the coating unit 2 are separated from each other by the first distance L1.

On the other hand, in the corner sections 133, 135, 137 and 138, the coating unit 2 moves at the second speed, and the adhesive dots 10 coated on the first substrate 110 by the coating unit 2 are separated from each other by the second distance L2. However, in the corner sections 133, 135, 137 and 138, there are portions at which the coating unit 2 does not coat the adhesive with respect to vertexes 133a, 135a, 137a and 138a, respectively.

Moreover, in a plurality of direction change sections 133b, 135b, 137b and 138b, the coating unit 2 moves at the third speed. In these sections, the coating unit 2 does not coat the adhesive.

Detailed operations of the control unit 4, moving unit 3, and coating unit 2 in each section are the same as the above description, and thus are not provided.

Figure 12:
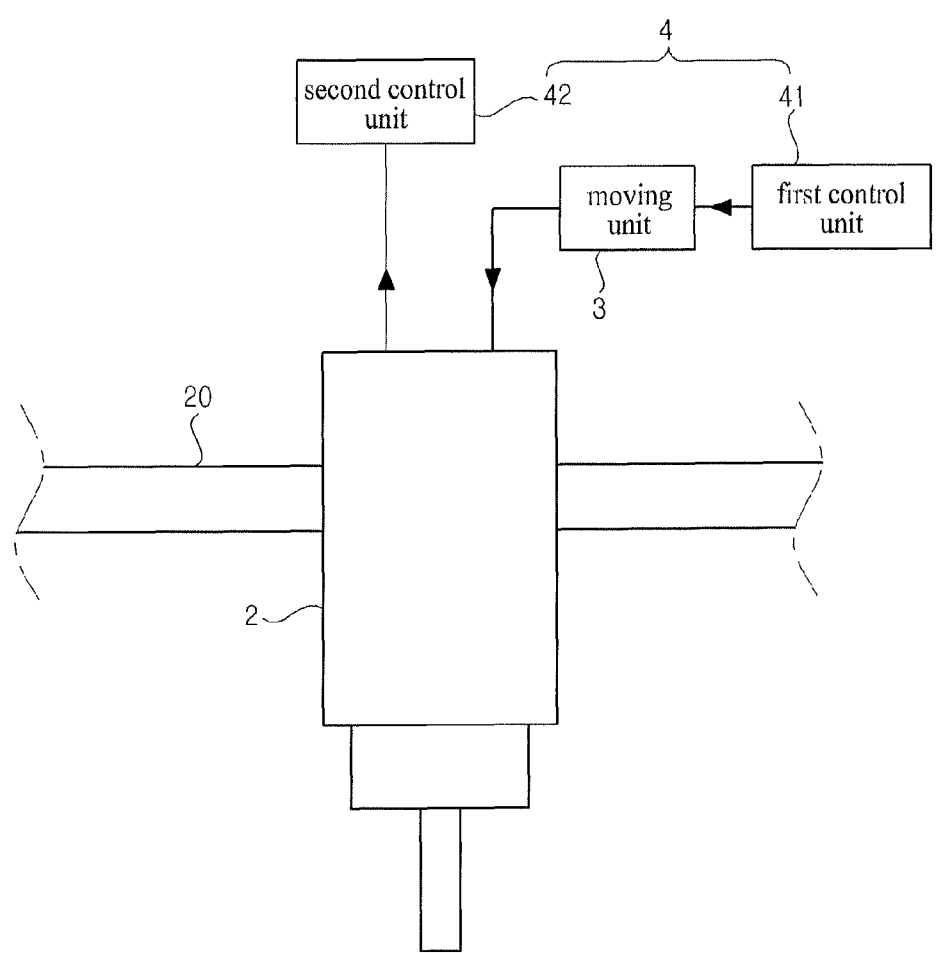
FIG. 12 is a view conceptually illustrating the adhesive coating apparatus according to an embodiment of the present invention.

Referring to FIG. 12, the adhesive coating apparatus according to the present invention may include a first control unit 41 and a second control unit 42.

The first control unit 41 denotes a controller that controls the moving unit 3 to adjust the speed of the coating unit 2.

On the other hand, the second control unit 42 does not control the moving unit 3, but processes various pieces of data that are collected when the adhesive coating apparatus according to the present invention is operating. For example, the second control unit 42 may collect position data of the coating unit 2 when the coating unit 2 is moving, and calculate a position of the coating unit 2. Therefore, the second control unit 42 may calculate a speed at which the coating unit 2 needs to move, a period at which the coating unit 2 needs to coat the adhesive, and a direction in which the coating unit 2 needs to move. According to the calculated results, the second control unit 42 transfers the moving speed data of the coating unit 2 to the first control unit 41, and allows the first control unit 41 to control the moving unit 3. Alternatively, according to the calculated results, the second control unit 42 transfers the power supply period data of the coating unit 2 to the power source (not shown), and allows the power source to adjust a spray period of the coating unit 2.

Like this, through divided control operations, the first control unit 41 controls only movement of the moving unit 3, and the second control unit 42 processes various pieces of data, thus accurately controlling a position of each of the adhesive and adhesive dots 10 sprayed from the coating unit 2. Accordingly, an error can be reduced.

Hereinafter, embodiments of an adhesive coating method according to the present invention will be described in detail with reference to the accompanying drawings.

Referring to FIGS. 3 to 11, the adhesive coating method according to the present invention performs a process that coats the adhesive on the first substrate 110 to couple the first substrate 110 and the second substrate 120. The adhesive coating method according to the present invention may be performed using the above-described adhesive coating apparatus according to the present invention.

The adhesive coating method according to the present invention may include the following operations.

First, the adhesive coating apparatus moves the coating unit 2, which coats the adhesive for forming the adhesive dots 10 on the first substrate 110, at the first speed so as to form the adhesive dots 10 separated from each other by the first distance L1 in the straight sections 131, 132, 134 and 136. In the operation of moving the coating unit 2 at the first speed, when the coating unit 2 is disposed in the straight sections 131, 132, 134 and 136, the control unit 4 may control the moving unit 3 to move the coating unit 2 at the first speed.

Subsequently, when the coating unit 2 enters from the straight sections 131, 132, 134 and 136 into the respective corner sections 133, 135, 137 and 138, the coating unit 2 is accelerated to the second speed faster than the first speed so as to form the adhesive dots 10 separated from each other by the second distance L2 greater than the first distance L1 in the corner sections 133, 135, 137 and 138. In the operation of accelerating the coating unit 2 to the second speed, when the coating unit 2 enters from the straight sections 131, 132, 134 and 136 into the respective corner sections 133, 135, 137 and 138, the control unit 4 may control the moving unit 3 to accelerate the coating unit 2 to the second speed.

Referring to FIGS. 3 to 11, the adhesive coating method according to the present invention may include the following operation.

When the coating unit 2 enters from the respective corner sections 133, 135, 137 and 138 into the direction change sections 133b, 135b, 137b and 138b in which the coating unit 2 changes a moving direction, the coating unit 2 entering the direction change sections 133b, 135b, 137b and 138b is decelerated to the third speed slower than the second speed. In the operation of decelerating the coating unit 2 to the third speed, when the coating unit 2 enters from the respective corner sections 133, 135, 137 and 138 into the direction change sections 133b, 135b, 137b and 138b, the control unit 4 may control the moving unit 3 to decelerate the coating unit 2 to the third speed.

Referring to FIGS. 3 to 11, the adhesive coating method according to the present invention may include the following operation.

When the coating unit 2 enters from the direction change sections 133b, 135b, 137b and 138b into the respective corner sections 133, 135, 137 and 138, the coating unit 2 entering the corner sections 133, 135, 137 and 138 is again accelerated to the second speed. In the operation of again accelerating the coating unit 2 to the second speed, when the coating unit 2 enters from the direction change sections 133b, 135b, 137b and 138b into the respective corner sections 133, 135, 137 and 138, the control unit 4 may control the moving unit 3 to accelerate the coating unit 2 to the second speed.

Referring to FIGS. 3 to 11, the operation of accelerating the coating unit 2 to the first speed in the straight section may include the following operation.

The coating unit 2 coats the adhesive at a first period in the straight sections 131, 132, 134 and 136. The operation, in which the coating unit 2 coats the adhesive at the first period, may be performed by the power source (not shown) supplying power to the coating unit 2 at the first period.

Referring to FIGS. 3 to 11, the operation of accelerating the coating unit 2 to the second speed in the corner section may include the following operation.

The coating unit 2 coats the adhesive at a second period in the corner sections 133, 135, 137 and 138. The operation, in which the coating unit 2 coats the adhesive at the second period, may be performed by the power source (not shown) supplying power to the coating unit 2 at the second period.

According to the embodiments of the present invention, the adhesive layer in the corner section is formed to a relatively thinner thickness, and prevents the adhesive layer from being spread to inside the substrate to cover the active area, thus enhancing a quality of an image displayed by the display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An adhesive coating method for forming an adhesive layer that adheres a first substrate to a second substrate and includes a straight section and a corner section, the adhesive coating method comprising:
   coating, with coating unit, an adhesive to form a plurality of adhesive dots on the first substrate;
   moving a coating unit at a first speed to form the plurality of adhesive dots which are separated from each other by a first distance in the straight section;
   when the coating unit enters from the straight section into the corner section, accelerating the coating unit to a second speed faster than the first speed to form a plurality of adhesive dots which are separated from each other by a second distance that is greater than the first distance in the corner section; and
   when the coating unit enters from the corner section into a direction change section in which the coating unit does not coat the adhesive and changes a moving direction, decelerating the coating unit entering the direction change section to a third speed slower than the second speed.

2. The adhesive coating method of claim 1, further comprising
   when the coating unit enters from the direction change section into the corner section, accelerating the coating unit entering the corner section to the second speed.

3. The adhesive coating method of claim 1, wherein,
   the moving of a coating unit comprises coating, by the coating unit, the adhesive at a first period in the straight section, and
   the accelerating of the coating unit comprises coating, by the coating unit, the adhesive at a second period longer than the first period in the corner section.

4. A display panel comprising:
   first substrate and second substrate coupled to each other in a direction facing each other; and
   an adhesive layer formed between the first substrate and the second substrate, and configured to adhere the first substrate to the second substrate,
   wherein,
   the first substrate has a plurality of sides,
   the adhesive layer has a first thickness in a first straight section parallel to a first side of the first substrate and a second straight section parallel to a second side of the first substrate vertically connected to the first side, and
   the adhesive layer has a second thickness thinner than the first thickness in a corner section that connects the first straight section to the second straight section.

5. An adhesive coating apparatus comprising:
   a coating unit configured to coat an adhesive on a first substrate to form a plurality of adhesive dots on the first substrate, the adhesive dots adhering the first substrate to a second substrate;
   a moving unit configured to move the coating unit such that the adhesive dots are formed apart from each other in the first substrate; and
   a control unit configured to control the moving unit to cause the coating unit to move at a first speed in a first straight section, for forming a plurality of adhesive dots which are separated from each other by a first distance in the first straight section, wherein when the coating unit enters from the first straight section into a corner section, the control unit controls the moving unit such that the coating unit entering the corner section is accelerated to a second speed faster than the first speed, for forming a plurality of adhesive dots which are separated from each other by a second distance greater than the first distance in the corner section, and wherein when the coating unit enters from the corner section into a direction change section, the control unit controls the moving unit such that the coating unit is decelerated to a third speed slower than the second speed and the coating unit does not coat the adhesive.

6. The adhesive coating apparatus of claim 5, wherein when the coating unit enters from the direction change section into the corner section, the control unit controls the moving unit such that the coating unit is accelerated to the second speed.

7. The adhesive coating apparatus of claim 5, wherein the control unit controls the coating unit to coat the adhesive at a first period in the first straight section, and to coat the adhesive at a second period longer than the first period in the corner section.

8. The adhesive coating apparatus of claim 5, wherein when the coating unit enters from the corner section into a second straight section facing a direction different from the first straight section, the control unit controls the moving unit such that the coating unit is decelerated to the first speed.

* * * * *